(12) United States Patent (10) Patent No.: US 12,596,420 B2
Chauhan et al. (45) Date of Patent: Apr. 7, 2026

(54) MANAGING SINK SIDE AND SOURCE SIDE DISPLAY POWER DELIVERY IN RESPONSE TO INTERMITTENT POWER FAILURES

(71) Applicant: Intel Corporation, Santa Clara, CA (US)

(72) Inventors: Shailendra Singh Chauhan, Bengaluru (IN); Arunthathi Chandrabose, Bangalore (IN); Ratheesh Nair, Bangalore (IN); Arvind Tomar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 785 days.

(21) Appl. No.: 17/841,246

(22) Filed: Jun. 15, 2022

(65) Prior Publication Data

US 2023/0409099 A1    Dec. 21, 2023

(51) Int. Cl.
G06F 1/00      (2006.01)
G06F 1/30      (2006.01)
G06F 3/14      (2006.01)
H02J 9/06      (2006.01)

(52) U.S. Cl.
CPC .............. G06F 1/30 (2013.01); G06F 3/1431 (2013.01); H02J 9/062 (2013.01); H02J 2310/58 (2020.01)

(58) Field of Classification Search
CPC ........ G06F 1/30; G06F 3/1431; G06F 3/1423;
G06F 1/263; G06F 1/266; G06F 1/3212;
G06F 1/3265; H02J 9/062; H02J 2310/58;
G09G 2330/021; G09G 2330/12; G09G
2370/10
See application file for complete search history.

(56) References Cited

U.S. PATENT DOCUMENTS

| | | | |
|---|---|---|---|
| 2006/0036885 A1* | 2/2006 | Hsieh | G06F 1/266 |
| | | | 713/300 |
| 2016/0239062 A1* | 8/2016 | Lee | H04N 21/4383 |
| 2018/0060261 A1* | 3/2018 | Chhor | G06F 13/4282 |
| 2019/0250692 A1* | 8/2019 | Kang | G06F 1/266 |
| 2020/0183471 A1* | 6/2020 | Liu | G06F 13/4282 |
| 2022/0107773 A1* | 4/2022 | Tomar | G06F 1/30 |
| 2022/0155846 A1* | 5/2022 | Woodbury | G06F 1/1632 |
| 2022/0310024 A1* | 9/2022 | Gao | G09G 5/10 |
| 2023/0039167 A1* | 2/2023 | Kamepalli | G06F 1/263 |

OTHER PUBLICATIONS

USB 3.0 Promoter Group, "Universal Serial Bus Type-C Cable and Connector Specification", Release 2.0, Aug. 2019, 373 pages.

* cited by examiner

*Primary Examiner* — Xuxing Chen
(74) *Attorney, Agent, or Firm* — NICHOLSON DE VOS WEBSTER & ELLIOTT LLP

(57) ABSTRACT

Systems, apparatuses and methods may provide for technology that configures a computing system to be a power sink from an external display, detects an alternating current (AC) power failure with respect to the external display, and configures the computing system to be a power source for the external display in response to the AC power failure. In one example, the technology places the external display in a low power state after the AC power failure is detected.

24 Claims, 5 Drawing Sheets

50

52

Configure a computing system to be a power sink from an external display

54

Detect an AC power failure with respect to the external display

56

Configure the computing system to be a power source for the external display in response to the AC power failure

MANAGING SINK SIDE AND SOURCE SIDE DISPLAY POWER DELIVERY IN RESPONSE TO INTERMITTENT POWER FAILURES

TECHNICAL FIELD

Embodiments generally relate to power management. More particularly, embodiments relate to managing sink side and source side display power delivery in response to intermittent power failures.

BACKGROUND

Universal Serial Bus (USB) technology (e.g., Universal Serial Bus Type-C Cable and Connector Specification, Release 2.0, August 2019, USB Implementers Forum) provides for charging and/or operating power to be supplied from a source device to one or more external sink devices connected to the source device. In modern work from home scenarios (e.g., most common or traditional home setups), a USB Type-C display may be powered by an AC (alternating current) supply and act as a source device with respect to a mobile computing system (e.g., laptop computer including a host processor and/or system on chip/SOC) connected to the display.

A typical Type-C display is enumerated with a power consumption in the range of 60 Watts (W) to 100 W. Host systems with a relatively small battery capability, however, cannot or will not have the budget/luxury to keep such a high power consuming display enumerated when the Type-C display loses power. Therefore, if the display encounters an AC power failure, the USB Type-C display may turn OFF and the host/SOC may enter a DC (direct current, e.g., battery powered) mode. In such a case, the content presented on the display (e.g., open applications or workloads) may be transferred from the display to an internal display (e.g., Embedded DisplayPort/eDP) of the mobile computing system. If the AC power failure is intermittent, the user may be required to manually transfer (e.g., drag and drop) the content back to the display when AC power resumes. Such a scenario may have a negative impact on the user experience, power consumption and/or battery life.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION OF EMBODIMENTS

Figure 1:
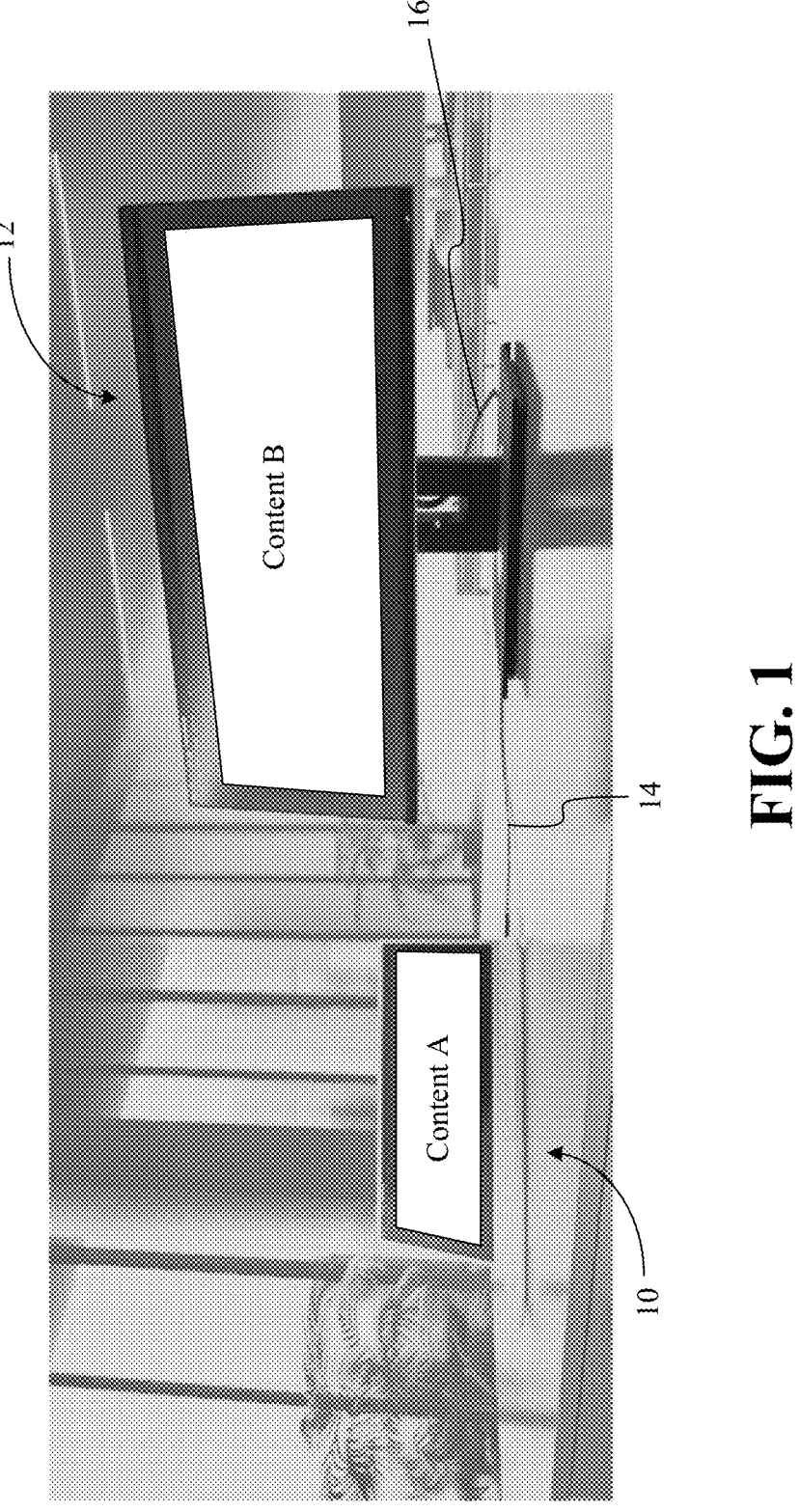
FIG. 1 is an illustration of an example of a connection between a computing system and an external display according to an embodiment.

Turning now to FIG. 1, a workstation configuration is shown in which a computing system 10 (e.g., laptop/notebook computer) is coupled to an external display 12 via an interface 14 (e.g., USB Type-C cable). In the illustrated example, the external display 12 is powered via an AC cable 16, which enables the external display 12 to provide operating and/or charging power to the computing system 10. Thus, the external display 12 may be considered a power source and the computing system 10 may be considered a power sink in the example shown.

If an AC power failure occurs with respect to the external display 12, the work environment may have a generator or common backup solution that has a delayed activation or the work environment may lack an uninterruptable power supply (UPS) for the external display 12. In such a case, the computing system 10 detects the AC power failure and automatically configures the computing system 10 to be a power source for the external display 12 (e.g., fast role swap). Thus, rather than permitting the external display 12 to turn OFF, the computing system 10 ensures that the external display 12 remains ON during the AC power failure. Moreover, the content presented on the external display ("Content B") continues to be presented on the external display 12 during the AC power failure.

As will be discussed in greater detail, the computing system 10 may also place the external display 12 in a low power state after the AC power failure is detected by, for example, reducing the brightness (e.g., nits), resolution and/or refresh rate of the external display 12. For example, with AC power, the display might operate at 4K UHD (Ultra High Definition) resolution with full brightness of 400 nits, wherein maximum power is being consumed. If an AC power loss occurs, the display resolution may be reduced to MD (Full High Definition) at a brightness of 150 nits. As a result, significant power savings (e.g., 25%) may be achieved, which enables a computing system with limited battery power to supply the external display. Such an approach may be particularly advantageous if the computing system 10 is operating in the DC mode (e.g., battery powered). In one example, the computing system 10 places the external display 12 into the low power mode based on extended display identification (EDID) data associated with the external display 12. The computing system 10 may also transfer the external display 12 out of the low power state in response to a determination that the AC power failure has ended (e.g., the AC power failure is intermittent/transient).

Moreover, the computing system 10 may re-configure itself as a power sink from the external display 12 in response to a determination that the AC power failure has ended. In an embodiment, the computing system 10 maintains the external display 12 in an extended monitor state (e.g., Content B is different from "Content A") during the AC power failure. In such a case, the computing system 10 may also transition the external display out of the extended monitor state in response to a determination that the AC power failure has existed for a predetermined amount of time (e.g., a timer has expired).

The computing system 10 is therefore considered performance-enhanced at least to the extent that automatically configuring itself to be a power source for the external display 12 in response to AC power failures improves the quality of experience (QOE) to the end user and/or achieves smoother operation with respect to Content B and Content A. Additionally, automatically placing the external display 12 in the low power mode enhances performance by extending battery life and/or reduces power consumption in the computing system 10.

Figure 2:
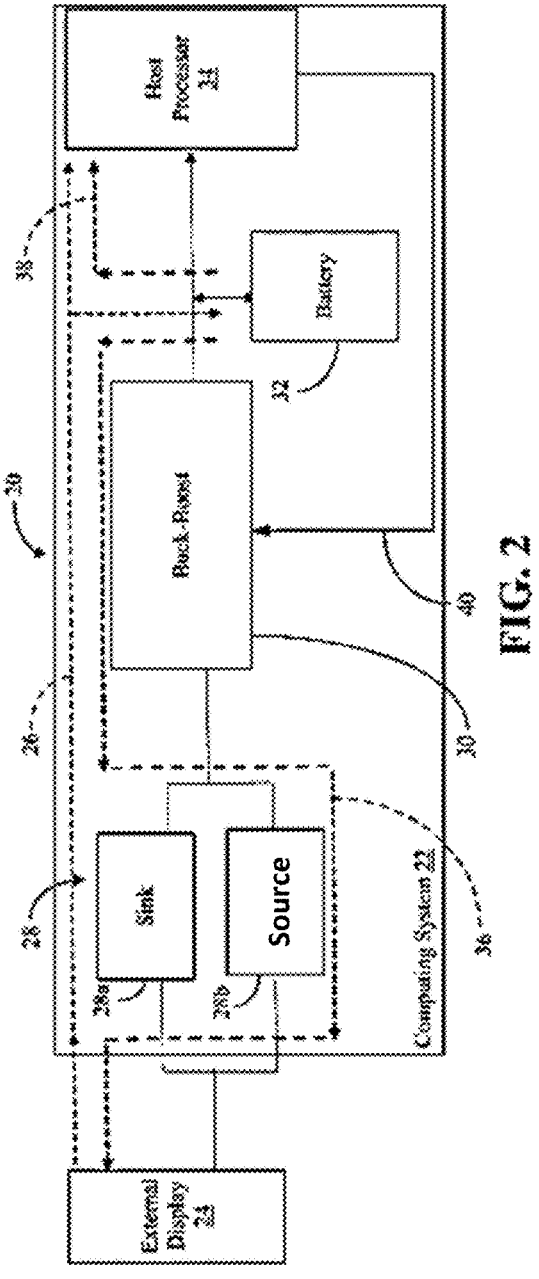
FIG. 2 is a block diagram of an example of a connection between a computing system and an external display according to an embodiment.

FIG. 2 shows a connection 20 between a computing system 22 (e.g., laptop/notebook computer, tablet, smart-phone) and an external display 24. In the illustrated example, the computing system 22 enumerates the external display 24 as a source device and an initial power path 26 flows through a sink portion 28*a* of a port 28 (28*a*, 28*b*) and a charger 30 (e.g., buck-boost) to a battery 32 and a host processor 34 (e.g., central processing unit/CPU in an SoC) in the computing system 22. Thus, the charger 30 initially supplies power to the host processor 34 and charges the battery 32.

When the AC power fails at the external display 24, the charger 30 will operate in reverse boost mode in response to a reverse boost enable signal 40 from the host processor 34 and a first power path 36 flows through the charger 30 and a source portion 28*b* of the port 28 to the external display 24. Thus, the charger 30 might boost the voltage of the battery 32 to a higher voltage (e.g., 20 Volts (V) or 48V) suitable for powering the external display 24. Additionally, a second power path 38 flows from the battery 32 to the host processor 34 during the AC power failure. As already noted, the computing system 22 may also place the external display 24 in a low power mode during the AC power failure.

Figure 3:
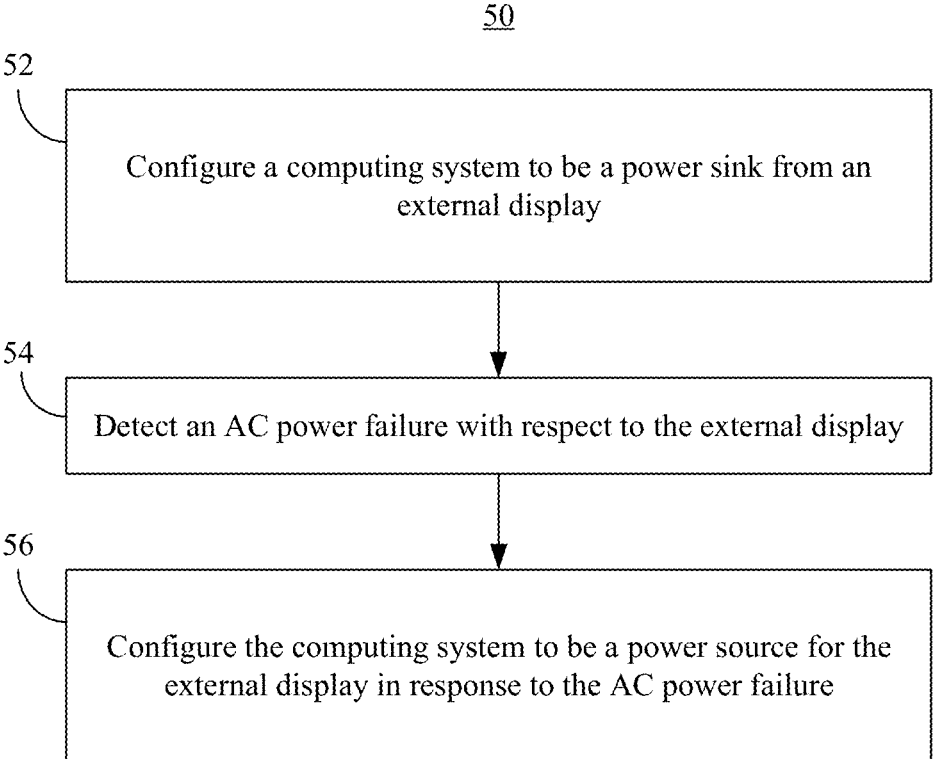
FIG. 3 is a flowchart of an example of a method of managing power delivery according to an embodiment.

FIG. 3 shows a method 50 of managing power delivery between a computing system and an external display. The method 50 may generally be implemented in a computing system such as, for example, the computing system 10 (FIG. 1) and/or the computing system 22 (FIG. 2). The method 50 may also be implemented in an external display such as, for example, the external display 12 (FIG. 1) and/or the external display 24 (FIG. 2). More particularly, the method 50 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

The illustrated processing block 52 provides for configuring a computing system to be a power sink (e.g., sink device) from an external display. Block 52 may involve enumerating the external display, placing the display in an extended monitor state and/or exchanging EDID data with the external display. In one example, block 52 also configures the external display to be a power source (e.g., source device) for the computing system.

Block 54 detects an AC power failure with respect to the external display, wherein the computing system is configured at block 56 to be a power source (e.g., source device) for the external display in response to the AC power failure. Block 54 may also include configuring the external display to be a power sink (e.g., sink device) from the computing system. In an embodiment, block 56 includes placing the external power display in a low power state by, for example, reducing the brightness, resolution and/or refresh rate of the external display. In this regard, resolution, refresh rate and brightness may be key characteristics that ensure visual quality on the external display. On average, 300 nits is considered a good rating and anything above 500 nits is extraordinary. In an AC powered scenario, the external display will be running on higher power characteristics (e.g., detected by the host from EDID data) and in the event of an AC failure, the host will keep the display enumerated with lower power characteristics for a pre-defined time (e.g., detected by the host from EDID data) for a certain duration. Thus, blocks 52 and/or 56 may also include parsing the EDID data from the external display.

As will be discussed in greater detail, the method 50 may also transfer the external display out of the low power state in response to a determination that the AC power failure has ended. In an embodiment, the method 50 re-configures the computing system as the power sink from the external display in response to a determination that the AC power failure has ended. Moreover, the method 50 may maintain the external display in an extended monitor state after the AC power failure is detected. In such a case, the method may transition (e.g., gradually/gracefully) the external display out of the extended monitor state in response to a determination that the AC power failure has existed for a predetermined amount of time (e.g., a timer has expired). The method 50 therefore enhances performance at least to the extent that automatically configuring the computing system to be a power source for the external display in response to AC power failures improves the QOE to the end user and/or achieves smoother operation with respect to presented content. Additionally, automatically placing the external display in the low power mode enhances performance by extending battery life and/or reduces power consumption in the computing system.

Figure 4:
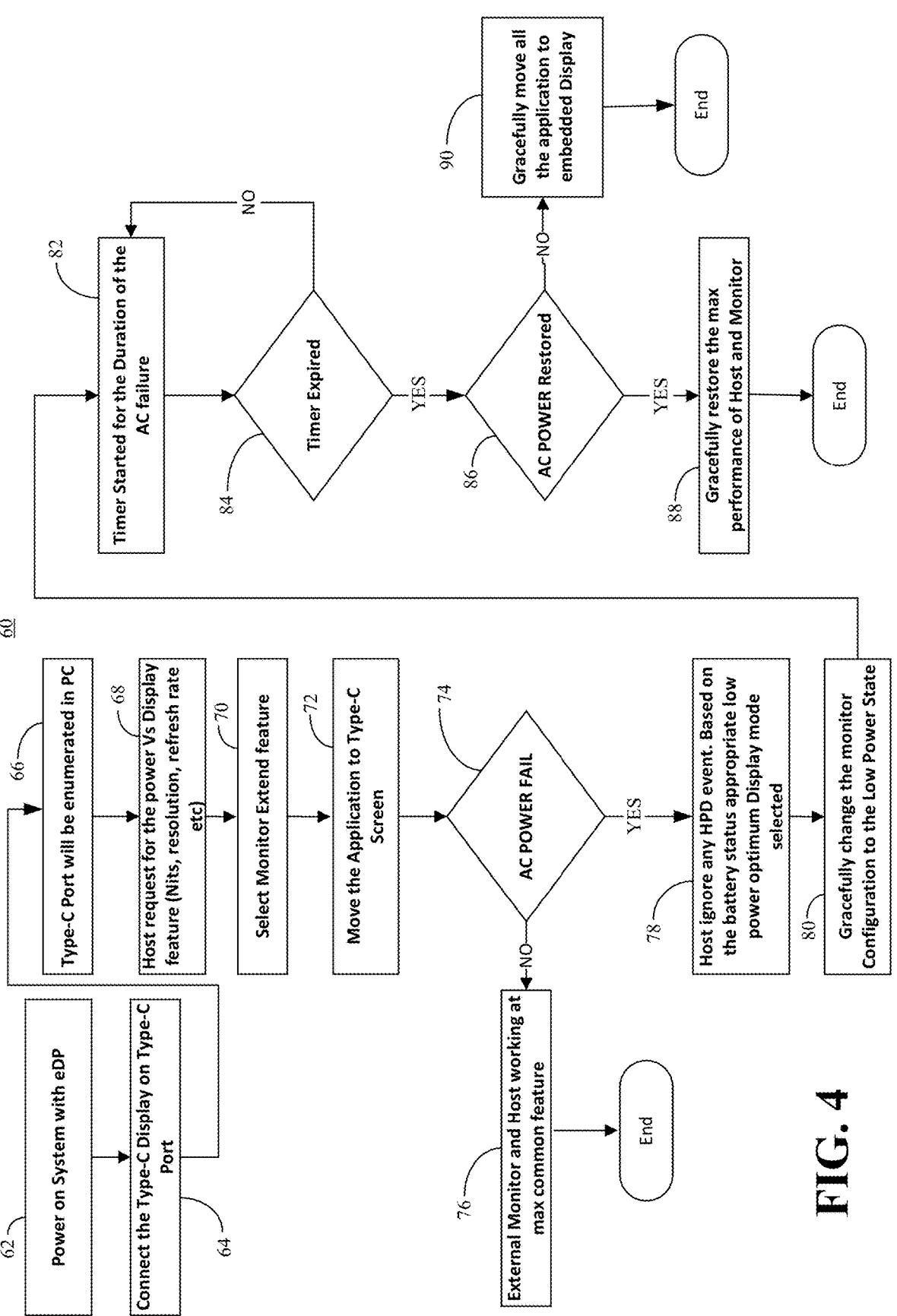
FIG. 4 is a flowchart of an example of a more detailed method of managing power delivery according to an embodiment.

FIG. 4 shows a more detailed method 60 of managing power delivery between a computing system and an external display. The method 60 may generally be implemented in a computing system such as, for example, the computing system 10 (FIG. 1) and/or the computing system 22 (FIG. 2). The method 60 may also be implemented in an external display such as, for example, the external display 12 (FIG. 1) and/or the external display 24 (FIG. 2). More particularly, the method 60 may be implemented in one or more modules as a set of logic instructions stored in a machine- or computer-readable storage medium such as RAM, ROM, PROM, firmware, flash memory, etc., in hardware, or any combination thereof.

Illustrated processing block 62 powers on the system with an eDP (e.g., internal display), wherein block 64 connects a Type-C display on a Type-C port. Block 66 enumerates the Type-C port in the computing system (e.g., personal computer/PC). Additionally, the host may request power versus display feature information (e.g., nits, resolution, refresh rate, etc.) at block 68. In one example, block 70 selects the monitor extend feature in the operating system (e.g., WINDOWS), wherein block 72 moves application content to the Type-C screen. A determination made be made at block 74 as to whether an AC power failure has occurred. If not, the external display and the host operate at their respective maximum (max) common features at block 76 and the method terminates. Otherwise, the host ignores hot plug detect (HPD) events at block 78. Additionally, block 78 may provide for selecting a low power state (e.g., optimum display mode) based on the battery status. In an embodiment, block 80 gracefully (e.g., gradually) changes the monitor configuration to the selected low power state.

Block 82 starts a timer for the duration of the AC failure, wherein a determination is made at block 84 as to whether the timer has expired. If not, the method 60 returns to block 82. Otherwise, a determination is made at block 86 as to whether AC power has been restored. If so, block 88 may gracefully restore the maximum performance of the host and the monitor and the method 60 terminates. If it is determined at block 86 that AC power has not been restored, illustrated block 90 gracefully moves all application content to the internal display and the method 60 terminates. Alternatively, the method 60 may include an option to conduct block 88 without waiting for the timer to expire.

Figure 5:
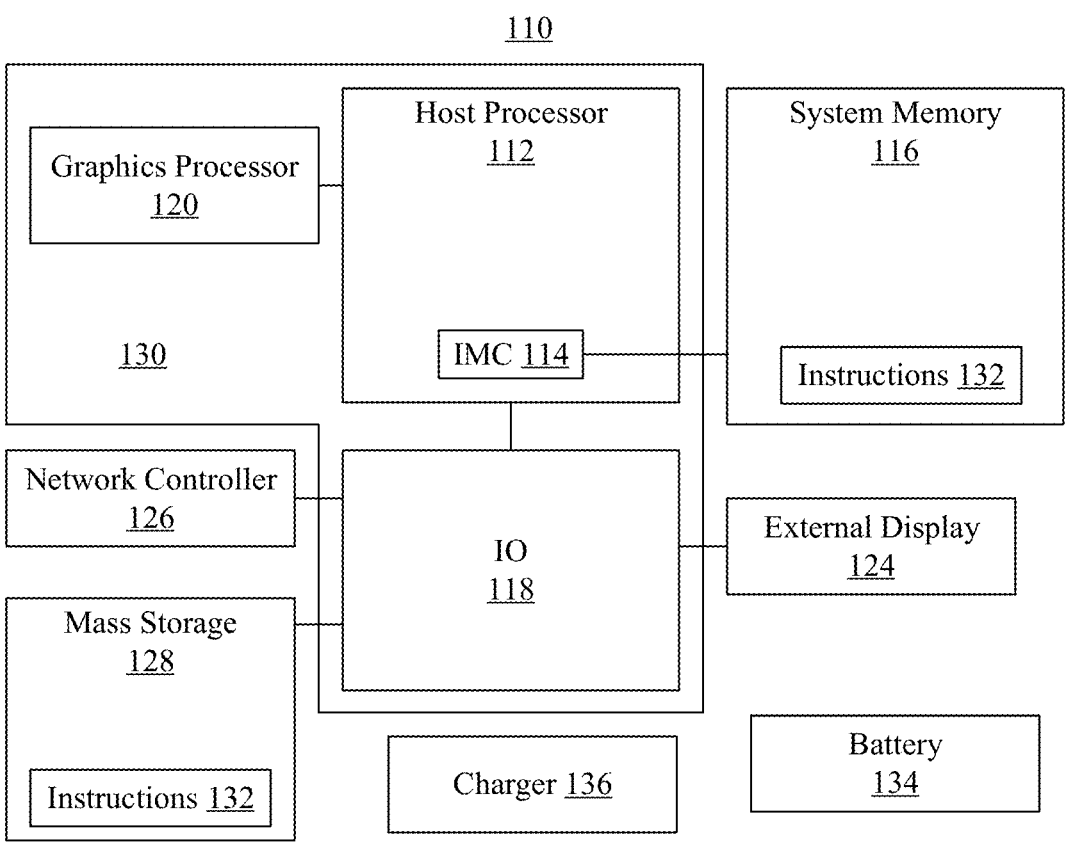
FIG. 5 is a block diagram of an example of a performance-enhanced computing system according to an embodiment.

Turning now to FIG. 5, a performance-enhanced computing system 110 (e.g., source device) is shown. The system 110 may generally be part of an electronic device/platform having computing functionality (e.g., personal digital assistant/PDA, notebook computer, tablet computer, convertible tablet, desktop computer, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 110 includes a host processor 112 (e.g., CPU) having an integrated memory controller (WIC) 114 that is coupled to a system memory 116. In an embodiment, an IO module 118 is coupled to the host processor 112. The illustrated IO module 118 communicates with, for example, a network controller 126 (e.g., wired and/or wireless), an external display 124, and mass storage 128 (e.g., hard disk drive/HDD, optical disc, solid-state drive/SSD, flash memory, etc.). The system 110 may also include a graphics processor 120 (e.g., graphics processing unit/GPU) that is incorporated with the host processor 112 and the IO module 118 into a system on chip (SoC) 130. The computing system 110 includes a charger 136 and a battery 134 that provides a battery output.

In one example, the mass storage 128 and/or the system memory 116 include instructions 132, which when executed by the SoC 130 and/or the host processor 112, causes the SoC 130, the host processor 112 and/or the computing system 110 to implement one or more aspects of the method 50 (FIG. 3) and/or the method 60 (FIG. 4), already discussed. Thus, execution of the instructions 132 causes the SoC 130, the host processor 112 and/or the computing system 110 to configure the computing system 110 to be a power sink from the external display 124, detect an AC power failure with respect to the external display 124, and automatically configure the computing system 110 to be a power source for the external display 124 in response to the AC power failure. The computing system 110 is therefore considered to be performance-enhanced at least to the extent that automatically configuring the computing system 110 to be a power source for the external display 124 in response to AC power failures improves the QOE to the end user and/or achieves smoother operation with respect to presented content. Additionally, automatically placing the external display 124 in a low power mode enhances performance by extending battery life and/or reduces power consumption in the computing system 110.

Figure 6:
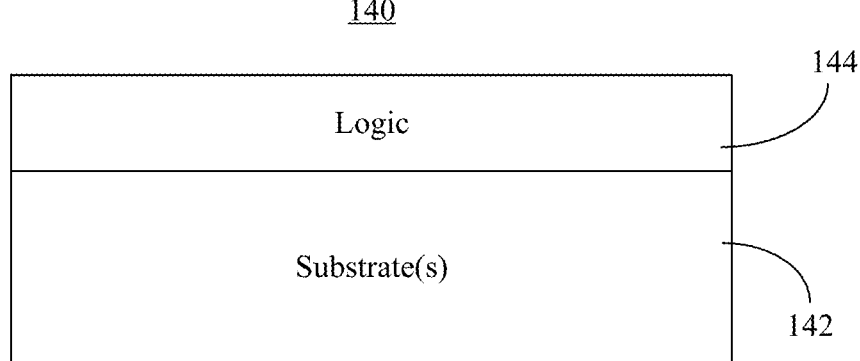
FIG. 6 is an illustration of an example of a semiconductor package apparatus according to an embodiment.

FIG. 6 shows a semiconductor apparatus 140 (e.g., chip and/or package). The illustrated apparatus 140 includes one or more substrates 142 (e.g., silicon, sapphire, gallium arsenide) and logic 144 (e.g., transistor array and other integrated circuit/IC components) coupled to the substrate(s) 142. In an embodiment, the logic 144 and implements one or more aspects of the method 50 (FIG. 3) and/or the method 60 (FIG. 4), already discussed.

The logic 144 may be implemented at least partly in configurable or fixed-functionality hardware. In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

ADDITIONAL NOTES AND EXAMPLES

Example 1 includes a performance-enhanced computing system comprising a port, a charger coupled to the port, a processing unit coupled to the charger, and a memory coupled to the processing unit, the memory including a set of instructions, which when executed by the processing unit, cause the processing unit to configure the computing system to be a power sink from an external display, detect an alternating current (AC) power failure with respect to the external display, and configure the computing system to be a power source for the external display in response to the AC power failure.

Example 2 includes the computing system of Example 1, wherein the instructions, when executed, further cause the processing unit to place the external display in a low power state after the AC power failure is detected.

Example 3 includes the computing system of Example 2, wherein the external display is placed in the low power state based on extended display identification data.

Example 4 includes the computing system of Example 2, wherein the instructions, when executed, further cause the processing unit to transfer the external display out of the low power state in response to a determination that the AC power failure has ended.

Example 5 includes the computing system of Example 2, wherein, to place the external display in the low power state, the instructions, when executed, further cause the processing unit to reduce one or more of a brightness, a resolution or a refresh rate of the external display.

Example 6 includes the computing system of Example 1, wherein the instructions, when executed, further cause the processing unit to re-configure the computing system as the power sink from the external display in response to a determination that the AC power failure has ended.

Example 7 includes the computing system of any one of Examples 1 to 6, wherein the instructions, when executed, further cause the computing system to maintain the external display in an extended monitor state after the AC power failure is detected.

Example 8 includes the computing system of Example 7, wherein the instructions, when executed, further cause the computing system to transition the external display out of the extended monitor state in response to a determination that the AC power failure has existed for a predetermined amount of time.

Example 9 includes at least one computer readable storage medium comprising a set of instructions, which when executed by a computing system, cause the computing system to configure the computing system to be a power sink from an external display, detect an alternating current (AC) power failure with respect to the external display, and configure the computing system to be a power source for the external display in response to the AC power failure.

Example 10 includes the at least one computer readable storage medium of Example 9, wherein the instructions, when executed, further cause the computing system to place the external display in a low power state after the AC power failure is detected.

Example 11 includes the at least one computer readable storage medium of Example 10, wherein the external display is placed in the low power state based on extended display identification data.

Example 12 includes the at least one computer readable storage medium of Example 10, wherein the instructions, when executed, further cause the computing system to transfer the external display out of the low power state in response to a determination that the AC power failure has ended.

Example 13 includes the at least one computer readable storage medium of Example 10, wherein, to place the external display in the low power state, the instructions, when executed, further cause the computing system to reduce one or more of a brightness, a resolution or a refresh rate of the external display.

Example 14 includes the at least one computer readable storage medium of Example 9, wherein the instructions, when executed, further cause the computing system to re-configure the computing system as the power sink from the external display in response to a determination that the AC power failure has ended.

Example 15 includes the at least one computer readable storage medium of any one of Examples 9 to 14, wherein the instructions, when executed, further cause the computing system to maintain the external display in an extended monitor state after the AC power failure is detected.

Example 16 includes the at least one computer readable storage medium of Example 15, wherein the instructions, when executed, further cause the computing system to transition the external display out of the extended monitor state in response to a determination that the AC power failure has existed for a predetermined amount of time.

Example 17 includes a semiconductor apparatus comprising one or more substrates, and logic coupled to the one or more substrates, wherein the logic is implemented at least partly in one or more of configurable or fixed-functionality hardware, the logic to configure a computing system to be a power sink from an external display, detect an alternating current (AC) power failure with respect to the external display, and configure the computing system to be a power source for the external display in response to the AC power failure.

Example 18 includes the semiconductor apparatus of Example 17, wherein the logic is further to place the external display in a low power state during the AC power failure.

Example 19 includes the semiconductor apparatus of Example 18, wherein the external display is placed in the low power state based on extended display identification data.

Example 20 includes the semiconductor apparatus of Example 18, wherein the logic is to transfer the external display out of the low power state in response to a determination that the AC power failure has ended.

Example 21 includes the semiconductor apparatus of Example 18, wherein, to place the external display in the low power state, the logic is to reduce one or more of a brightness, a resolution or a refresh rate of the external display.

Example 22 includes the semiconductor apparatus of Example 17, wherein the logic is further to re-configure the computing system as the power sink from the external display in response to a determination that the AC power failure has ended.

Example 23 includes the semiconductor apparatus of any one of Examples 17 to 22, wherein the logic is further to maintain the external display in an extended monitor state after the AC power failure is detected.

Example 24 includes the semiconductor apparatus of Example 23, wherein the logic is further to transition the external display out of the extended monitor state in response to a determination that the AC power failure has existed for a predetermined amount of time.

Example 25 includes a method of operating a performance-enhanced computing system comprising configuring the computing system to be a power sink from an external display, detecting an alternating current (AC) power failure with respect to the external display, and configuring the computing system to be a power source for the external display in response to the AC power failure.

Example 26 includes an apparatus comprising means for performing the method of Example 25.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a port;
a charger coupled to the port;
a processing unit coupled to the charger; and
a memory coupled to the processing unit, the memory including a set of instructions, which when executed by the processing unit, cause the processing unit to:
configure the computing system to be a power sink from an external display that is coupled to the port,
detect an alternating current (AC) power failure with respect to the external display, and
configure the computing system to be a power source for the external display, as it remains coupled to the port, in response to the AC power failure.

2. The computing system of claim 1, wherein the instructions, when executed, further cause the processing unit to place the external display in a low power state after the AC power failure is detected.

3. The computing system of claim 2, wherein the external display is placed in the low power state based on extended display identification data.

4. The computing system of claim 2, wherein the instructions, when executed, further cause the processing unit to transfer the external display out of the low power state in response to a determination that the AC power failure has ended.

5. The computing system of claim 2, wherein, to place the external display in the low power state, the instructions, when executed, further cause the processing unit to reduce one or more of a brightness, a resolution or a refresh rate of the external display.

6. The computing system of claim 1, wherein the instructions, when executed, further cause the processing unit to re-configure the computing system as the power sink from the external display in response to a determination that the AC power failure has ended.

7. The computing system of claim 1, wherein the instructions, when executed, further cause the computing system to maintain the external display in an extended monitor state after the AC power failure is detected.

8. The computing system of claim 7, wherein the instructions, when executed, further cause the computing system to transition the external display out of the extended monitor state in response to a determination that the AC power failure has existed for a predetermined amount of time.

9. At least one non-transitory computer readable storage medium comprising a set of instructions, which when executed by a computing system, cause the computing system to:
configure the computing system to be a power sink from an external display that is electrically coupled to the computing system;

detect an alternating current (AC) power failure with respect to the external display; and
configure the computing system to be a power source for the external display as it remains coupled to the computing system in response to the AC power failure.

10. The at least one non-transitory computer readable storage medium of claim 9, wherein the instructions, when executed, further cause the computing system to place the external display in a low power state after the AC power failure is detected.

11. The at least one non-transitory computer readable storage medium of claim 10, wherein the external display is placed in the low power state based on extended display identification data.

12. The at least one non-transitory computer readable storage medium of claim 10, wherein the instructions, when executed, further cause the computing system to transfer the external display out of the low power state in response to a determination that the AC power failure has ended.

13. The at least one non-transitory computer readable storage medium of claim 10, wherein, to place the external display in the low power state, the instructions, when executed, further cause the computing system to reduce one or more of a brightness, a resolution or a refresh rate of the external display.

14. The at least one non-transitory computer readable storage medium of claim 9, wherein the instructions, when executed, further cause the computing system to re-configure the computing system as the power sink from the external display in response to a determination that the AC power failure has ended.

15. The at least one non-transitory computer readable storage medium of claim 9, wherein the instructions, when executed, further cause the computing system to maintain the external display in an extended monitor state after the AC power failure is detected.

16. The at least one non-transitory computer readable storage medium of claim 15, wherein the instructions, when executed, further cause the computing system to transition the external display out of the extended monitor state in response to a determination that the AC power failure has existed for a predetermined amount of time.

17. A semiconductor apparatus comprising:
one or more substrates; and
logic coupled to the one or more substrates, wherein the logic is implemented at least partly in one or more of configurable or fixed-functionality hardware, the logic to:
configure a computing system to be a power sink from an external display that is electrically coupled to the computing system through an external port;
detect an alternating current (AC) power failure with respect to the external display; and
configure the computing system to be a power source for the external display as it remains coupled to the computing system in response to the AC power failure.

18. The semiconductor apparatus of claim 17, wherein the logic is further to place the external display in a low power state during the AC power failure.

19. The semiconductor apparatus of claim 18, wherein the external display is placed in the low power state based on extended display identification data.

20. The semiconductor apparatus of claim 18, wherein the logic is to transfer the external display out of the low power state in response to a determination that the AC power failure has ended.

21. The semiconductor apparatus of claim 18, wherein, to place the external display in the low power state, the logic is to reduce one or more of a brightness, a resolution or a refresh rate of the external display.

22. The semiconductor apparatus of claim 17, wherein the logic is further to re-configure the computing system as the power sink from the external display in response to a determination that the AC power failure has ended.

23. The semiconductor apparatus of claim 17, wherein the logic is further to maintain the external display in an extended monitor state after the AC power failure is detected.

24. The semiconductor apparatus of claim 23, wherein the logic is further to transition the external display out of the extended monitor state in response to a determination that the AC power failure has existed for a predetermined amount of time.

\* \* \* \* \*